US008894129B2

(12) United States Patent
Katou et al.

(10) Patent No.: US 8,894,129 B2
(45) Date of Patent: Nov. 25, 2014

(54) VEHICLE BODY STRUCTURE

(75) Inventors: Ryuuzou Katou, Zama (JP); Takahiro Kikuchi, Machida (JP); Shinichi Kunishima, Chigasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 379 days.

(21) Appl. No.: 13/180,979

(22) Filed: Jul. 12, 2011

(65) Prior Publication Data
US 2012/0049571 A1 Mar. 1, 2012

(30) Foreign Application Priority Data

Aug. 25, 2010 (JP) ................................ 2010-187974

(51) Int. Cl.
*B62D 25/08* (2006.01)
*B62D 21/15* (2006.01)

(52) U.S. Cl.
CPC ............ *B62D 21/152* (2013.01); *B62D 21/155* (2013.01)
USPC ................................ 296/187.03; 296/187.09

(58) Field of Classification Search
CPC ............................ B62D 21/157; B62D 21/152
USPC .................... 296/187.1, 187.03, 187.09, 198, 296/203.02, 193.09, 204, 205; 180/312
See application file for complete search history.

(56) References Cited

U.S. PATENT DOCUMENTS

| | | | |
|---|---|---|---|
| 5,048,888 A * | 9/1991 | Willy et al. ............... | 296/187.03 |
| 6,736,448 B2 * | 5/2004 | Hanakawa et al. ....... | 296/187.09 |
| 6,866,115 B2 | 3/2005 | Miyasaka | |
| 6,880,663 B2 * | 4/2005 | Fujiki et al. .................... | 180/232 |
| 6,938,948 B1 * | 9/2005 | Cornell et al. ........... | 296/187.09 |
| 7,147,275 B2 * | 12/2006 | Matsuyama et al. ...... | 296/203.02 |
| 7,201,249 B2 * | 4/2007 | Kosaka ......................... | 180/274 |
| 7,213,873 B2 * | 5/2007 | Murata et al. ................. | 296/204 |
| 7,380,830 B2 * | 6/2008 | Mitsui et al. .................. | 280/784 |
| 7,431,384 B2 * | 10/2008 | Kapadia et al. ........... | 296/193.09 |

(Continued)

FOREIGN PATENT DOCUMENTS

| | | |
|---|---|---|
| CN | 1457309 | 11/2003 |
| EP | 1225072 | 7/2002 |
| FR | 2893581 | 5/2007 |
| JP | 2005-271810 A | 10/2005 |
| JP | 2006-290111 A | 10/2006 |

OTHER PUBLICATIONS

An English translation of the Chinese Office Action for the corresponding Chinese application No. 201110226181.6 issued on Dec. 27, 2012.

(Continued)

*Primary Examiner* — Pinel Romain
(74) *Attorney, Agent, or Firm* — Global IP Counselors, LLP (57) ABSTRACT

A vehicle body structure is proved that basically includes a pair of side frame members and a pair of suspension support members. The side frame members extend in a longitudinal direction of the vehicle body structure and are configured to absorb energy imparted during a collision in the longitudinal direction of the vehicle body structure by undergoing an axial collapse. The suspension support members are arranged parallel to the side frame members. The suspension support members serve to support a suspension link member, and are configured to bend during the collision. Each of the suspension support members includes a rotation inducing structure that is configured to induce a bending rotation of the suspension support members during the collision upon an imparted load input from the collision being equal to or larger than a predetermined value.

10 Claims, 7 Drawing Sheets

(56) References Cited

U.S. PATENT DOCUMENTS

| | | | |
|---|---|---|---|
| 7,556,310 B2* | 7/2009 | Miki | 296/204 |
| 7,641,270 B2* | 1/2010 | Takeda | 296/203.02 |
| 7,762,619 B2* | 7/2010 | Baccouche et al. | 296/187.09 |
| 2003/0075951 A1* | 4/2003 | Hanakawa et al. | 296/188 |
| 2003/0094803 A1 | 5/2003 | Fujiki et al. | |
| 2004/0200659 A1* | 10/2004 | Miyasaka | 180/312 |
| 2005/0077754 A1 | 4/2005 | Tomita | |
| 2007/0144851 A1* | 6/2007 | Ginja et al. | 188/377 |
| 2008/0224502 A1* | 9/2008 | Miki | 296/203.02 |
| 2009/0146462 A1* | 6/2009 | Sato et al. | 296/203.03 |
| 2010/0253102 A1* | 10/2010 | Riviere et al. | 293/121 |

OTHER PUBLICATIONS

The extended European Search Report for the corresponding European Patent Application No. 11178556.4-1268 dated Nov. 21, 2011.
An English translation of the Chinese Written Notification of Opinion Upon the second Examination of corresponding Chinese Application No. 201110226181.6, issued on Jun. 24, 2013.
An English translation of the Japanese Office Action for the corresponding Japanese patent application No. 2010-187974 issued on Apr. 8, 2014.
European Office Action for the corresponding European patent application No. 11 178 556.4 issued on Sep. 3, 2014.

* cited by examiner

VEHICLE BODY STRUCTURE

CROSS-REFERENCE TO RELATED APPLICATIONS

This application claims priority to Japanese Patent Application No. 2010-187974, filed on Aug. 25, 2010. The entire disclosure of Japanese Patent Application No. 2010-187974 is hereby incorporated herein by reference.

BACKGROUND

1. Field of the Invention

The present invention generally relates to a vehicle body structure having side frame members and suspension support members that are configured to absorb an input energy imparted during a collision.

2. Background Information

During a front end collision, a front end of a vehicle body will collapse in a longitudinal direction of the vehicle. In order to improve an energy absorption efficiency of a vehicle body frame during a front end collision, a conventionally known engine support structure is configured such that side frame members undergo axial collapse and suspension support members undergoes bending during a front end collision. For example, a vehicle body frame is disclosed in Japanese Laid-Open Patent Publication No. 2006-290111 that includes such a conventional engine support structure.

SUMMARY

In the conventional engine support structure, such as discussed above, the suspension support members are each generally shaped as a straight rod extending in a longitudinal direction of the vehicle. With this straight rod configuration, the suspension support members are not configured so as to be induced to bend during a front end collision. Thus, when a force acts on the side frame members in an out-of-plane (lateral) direction during a front end collision, the axial collapse of the side frame members does not proceed smoothly and the axial collapse of the side frame members will not necessarily continue even after the suspension support members has undergone bending. Consequently, in a front end collision with such a conventional engine support structure, it may not always be possible to control a deceleration rate (i.e., a reaction force) of the vehicle body with the axial collapse of the side frame members, and thus, a vehicle crushing amount will increase.

The vehicle body structure of the present disclosure was conceived in view of this problem. One object proposed in this present disclosure is to provide a vehicle body structure that can control a vehicle body deceleration rate as intended during a front end collision and thereby increase the vehicle body deceleration rate and hold a vehicle crushing amount to a small amount.

In view of the state of the known technology, one aspect of the present disclosure is to provide a vehicle body structure that basically comprises a pair of side frame members and a pair of suspension support members. The side frame members extend in a longitudinal direction of the vehicle body structure and are configured to absorb energy imparted during a collision in the longitudinal direction of the vehicle body structure by undergoing an axial collapse. The suspension support members are arranged parallel to the side frame members. The suspension support members serve to support a suspension link member, and are configured to bend during the collision. Each of the suspension support members includes a rotation inducing structure that is configured to induce a bending rotation of the suspension support members during the collision upon an imparted load input from the collision being equal to or larger than a predetermined value.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
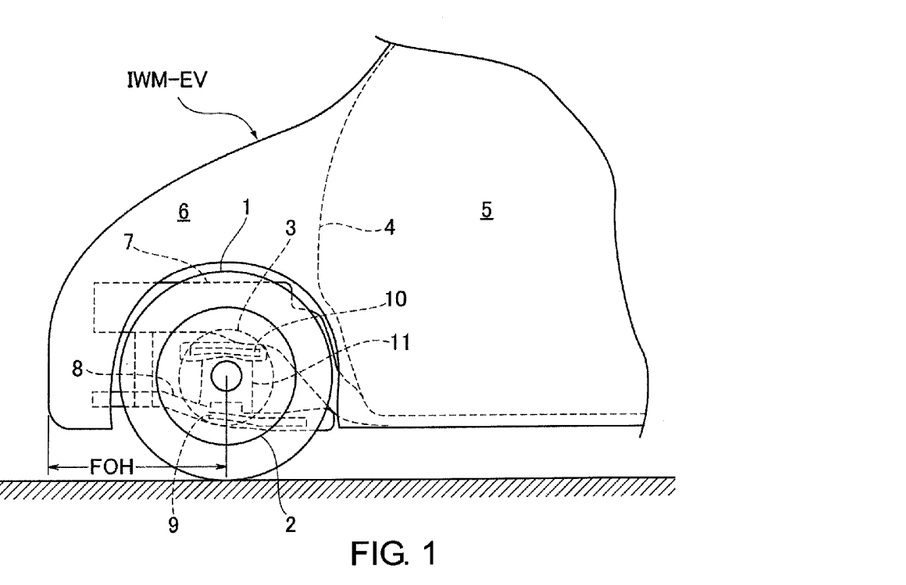
FIG. 1 is a schematic side elevational view of an electric vehicle having a front section vehicle body structure in accordance with one illustrated embodiment.

Referring initially to FIG. 1, a front section vehicle body structure is illustrated in accordance with one illustrated embodiment. The front section vehicle body structure is configured to control a vehicle body deceleration rate as intended during a collision such that the vehicle body deceleration rate is increased and a vehicle crushing amount is held to a small amount. Basically, FIG. 1 illustrates a schematic side elevational view of an electric vehicle IWM-EV in which the front section vehicle body structure is employed. In the illustrated embodiment, the electric vehicle IWM-EV has a front wheel 1 with a hub 2 that has an in-wheel motor 3 installed inside of the hub 2. With this electric vehicle IWM-EV, a dash panel 4 divides an interior of the electric vehicle IWM-EV into a cabin 5 and a motor room 6. The motor room 6 typically includes an engine and/or a motor inside the motor room 6. However, it is not necessary to arrange a power train such that the engine or the motor is disposed inside the motor room 6. Consequently, in such a case, a front overhang FOH can be made much shorter than in the case of a front engine-driven vehicle or an electric vehicle having an electric motor installed in the engine room. The term "overhang" of a vehicle refers to portions of the vehicle body that protrude outward beyond a contact center point where a wheel contacts the ground. In particular, the term front overhang refers to an amount by which a front end of the vehicle body protrudes in a frontward direction beyond an axial centerline of the front wheels. On the other hand, the term rear overhang refers to an amount by which a rear end of the vehicle body protrudes in a rearward direction beyond an axial centerline of the rear wheels. Accordingly, the vehicle body structure as disclosed herein could be applied to a rear end of a vehicle such as a rear engine-driven vehicle.

Figure 2:
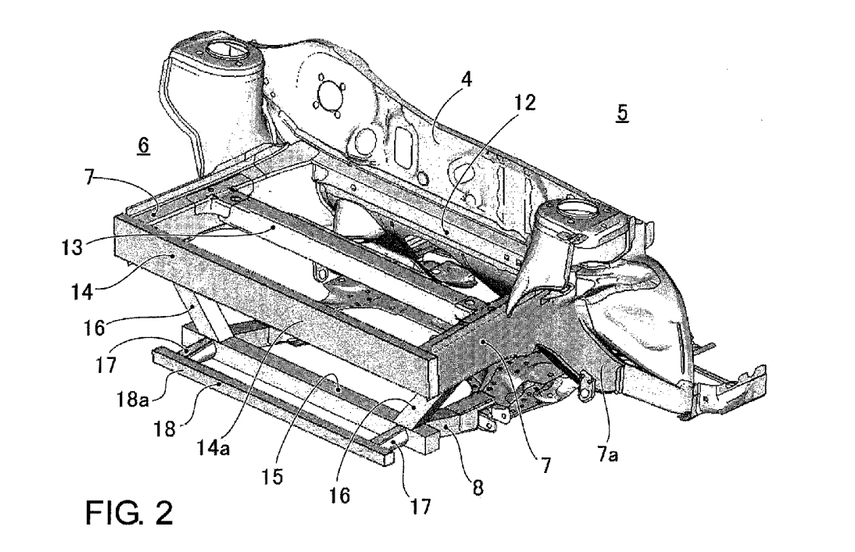
FIG. 2 is a perspective view of the front section vehicle body structure illustrated in FIG. 1 in accordance with the illustrated embodiment.

Basically, in the illustrated embodiment, the front vehicle body structure of the electric vehicle IWM-EV includes a pair of front side frame members 7 and a pair of front suspension support member 8 as shown in FIGS. 1 and 2. The front side frame members 7 are arranged in left and right positions of the vehicle body on the left and right of the motor room 6. The front side frame members 7 form left and right portions of the vehicle body frame that extend in a longitudinal direction of the vehicle. The front side frame members 7 are configured and arranged to serve to absorb energy imparted during a front end collision by undergoing an axial collapse. As seen in FIG. 1, this electric vehicle IWM-EV has a frame portion, a diagonal or slanted portion and a horizontal portion. The frame portion is arranged in a position on the lower section of the vehicle body in a region corresponding to the cabin 5 and forms a portion of the vehicle body frame that extends rearward from the dash panel 4 in a longitudinal direction of the vehicle. The diagonal portion extends diagonally upward and frontward toward an inside of the vehicle from a position on the frame portion located at the dash panel 4. The horizontal portion extends horizontally frontward from the diagonal portion. As used herein, the term "front side frame member" refers to the horizontal portion (i.e., the front side frame member 7) that serves to absorb input energy imparted during a front end collision by undergoing an axial collapse. The diagonal or portion is called a side frame extension that serves to support the front suspension support members 8 in an axial direction as discussed below.

As diagrammatically illustrated in FIG. 1, the front suspension support members 8 are substantially parallel to the front side frame members 7 in a side elevational view. Each of the front suspension support members 8 serves to support a lower link 9, while each of the front side frame members 7 serves to support an upper link 10. Consequently, the suspension supporting the front wheel 1 on the vehicle body is a two-link type suspension having the lower link 9 and the upper link 10 serving as suspension link members. More specifically, each of the lower links 9 is supported on a corresponding one of the front suspension support members 8, which forms part of a trapezoidal frame, and each of the upper links 10 is supported on a cross suspension member 11 including a frame member that is fixed to the front suspension support members 8 and crosses over the front suspension support members 8. The front suspension support members 8 are configured to bend downward during a front end collision that imparts a load input in the longitudinal direction of the vehicle body structure. Since the electric vehicle IWM-EV has the in-wheel motor 3, the unsprung weight of the suspension is slightly higher than in an electric vehicle having an electric motor arranged in the motor room 6.

The front section vehicle body structure according to the first embodiment will now be explained in more detail with reference to FIGS. 2 to 8B. As shown in FIG. 2, the dash panel 4 partitions the cabin 5 and the motor room 6. The front side frame members 7 extend toward a front of the vehicle along upper positions of the motor room 6. The front suspension support members 8 extend toward a front of the vehicle from the same base portion as the front side frame members 7 but at a position lower than the front side frame members 7.

Figure 3:
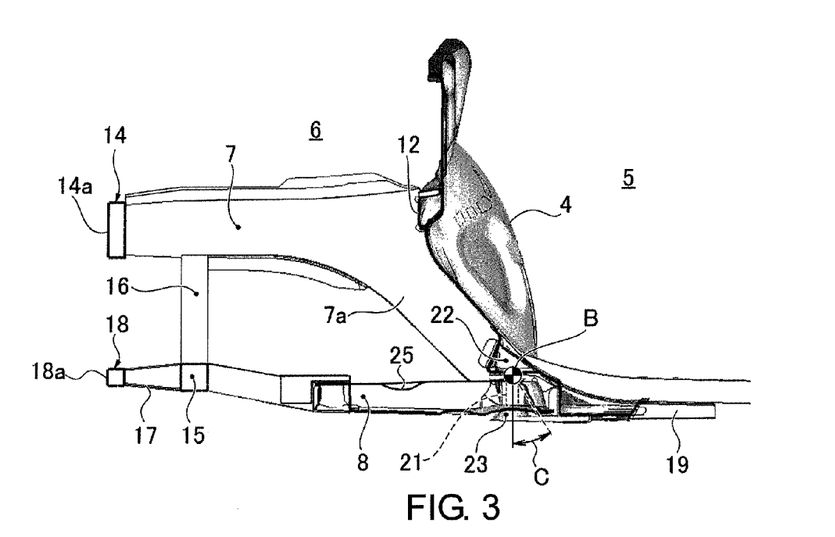
FIG. 3 is a side elevational view of the front section vehicle body structure illustrated in FIGS. 1 and 2 in accordance with the illustrated embodiment.

As shown in FIG. 2, the front side frame members 7 are coupled together in a widthwise direction of the vehicle by a dash cross member 12, a center cross member 13, and a first front end cross member 14. The dash cross member 12 is fixed to the dash panel 4. The center cross member 13 is fixed to the front side frame members 7 at a position midway between the dash cross member 12 and the first front end cross member 14. The first front end cross member 14 is fixed to front free ends of the front side frame members 7. As shown in FIG. 2, the front suspension support members 8 are further coupled together with a suspension cross member 15 and a pair of connecting members 16. The suspension cross member 15 and the connecting members 16 are arranged at front end positions of the front suspension support members 8 so as to form a trapezoidal frame. The suspension cross member 15 has a pair of crush boxes 17 fixed thereto. The suspension cross member 15 extend in a frontward direction of the vehicle from the suspension cross member 15. A second front end cross member 18 is connected across tip end portions of the cross boxes 17 in a widthwise direction of the vehicle. The first front end cross member 14 and the second front end cross member 18 serve as impact force input members during a front end collision. As shown in FIG. 3, frontward end faces 14*a* and 18*a* of the two cross members 14 and 18 are arranged to be in the same position in a longitudinal direction of the vehicle when viewed in a side elevational view.

Figure 4:
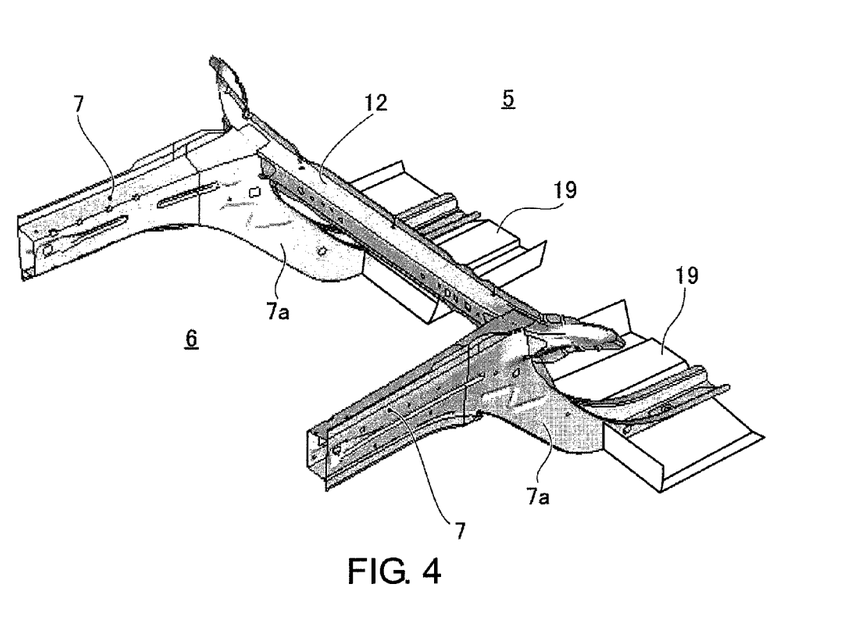
FIG. 4 is a perspective view of a portion (e.g., the front side frame members and front suspension support members) of the front section vehicle body structure according to the first embodiment that constitutes a reaction force bearing structure in accordance with the illustrated embodiment.

As shown in FIG. 3, the dash cross member 12 serves as a main reaction force bearing structure for the front side frame members 7 during a front end collision. Similarly, as shown in FIG. 4, each of the front side frame members 7 has a side frame extension 7a. The side frame extensions 7a extend diagonally from the front side frame members 7. Each of the side frame extensions 7a has an outrigger panel 19 that is provided as a reinforcing plate. The outrigger panels 19 form extended horizontal portions of the front side frame members 7. The outrigger panels 19 serve as part of the main reaction force bearing structure for the front suspension support members 8 during a front end collision.

Figure 5:
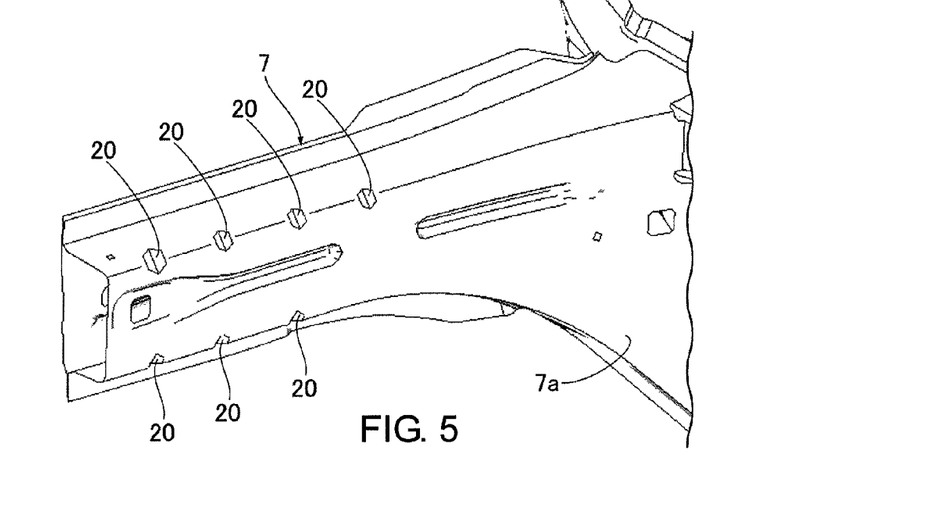
FIG. 5 is a perspective view of one of the front side frame members of the front section vehicle body structure illustrated in FIGS. 1 to 4 in accordance with the illustrated embodiment.

As shown in FIG. 5, each of the front side frame members 7 has a plurality of crushing beads 20. The crushing beads 20 are provided along a ridge line of each of the front side frame members 7 in order to cause axial collapsing to occur during a front end collision. The positioning and shape of the crushing beads 20 are set as appropriate in order to achieve a vehicle deceleration rate determined in advance in accordance with a predetermined vehicle deceleration rate control objective. Thus, the crushing beads 20 form an axial collapsing structure of the front side frame members 7.

Figure 6:
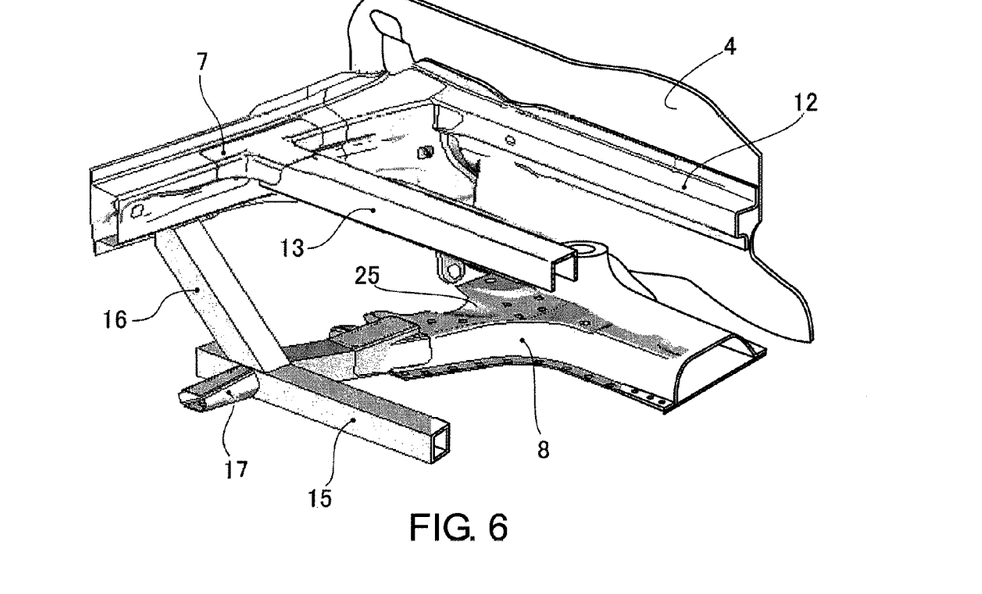
FIG. 6 is a perspective view of a cross sectional shape of the cross member and the front suspension support members of the front section vehicle body structure illustrated in FIGS. 1 to 5 in accordance with the illustrated embodiment.

As shown in FIGS. 2 and 6, the center cross member 13 is provided as a shape reinforcing member serving to prevent the front side frame members 7 from undergoing widthwise or lateral bending due to an impact force input so that the front side frame members 7. Thus, the center cross member 13 aids in ensuring that the front side frame members 7 axial collapse during a front end collision. As shown in FIG. 6, the center cross member 13 has a cross sectional shape that is open on a bottom side so that it can reinforce the shape of the front side frame members 7 without impeding the axial collapsing deformation of the front side frame members 7.

Figure 7:
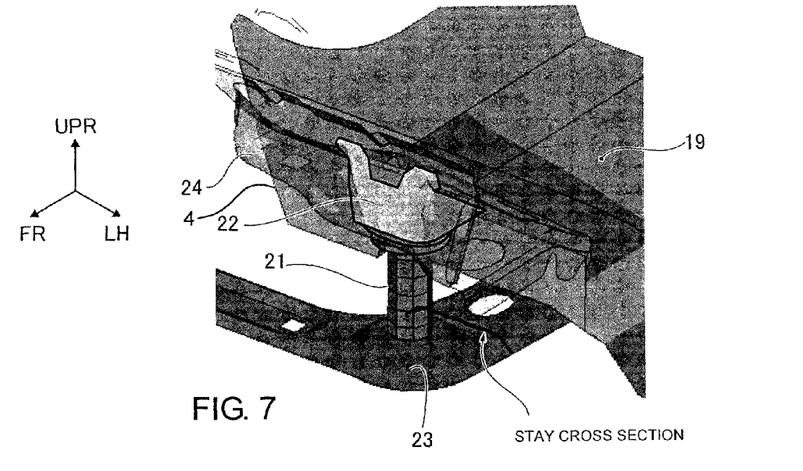
FIG. 7 is a perspective view of a vehicle body support section of a front suspension support members of the front section vehicle body structure illustrated in FIGS. 1 to 6 in accordance with the illustrated embodiment.
Figure 9:
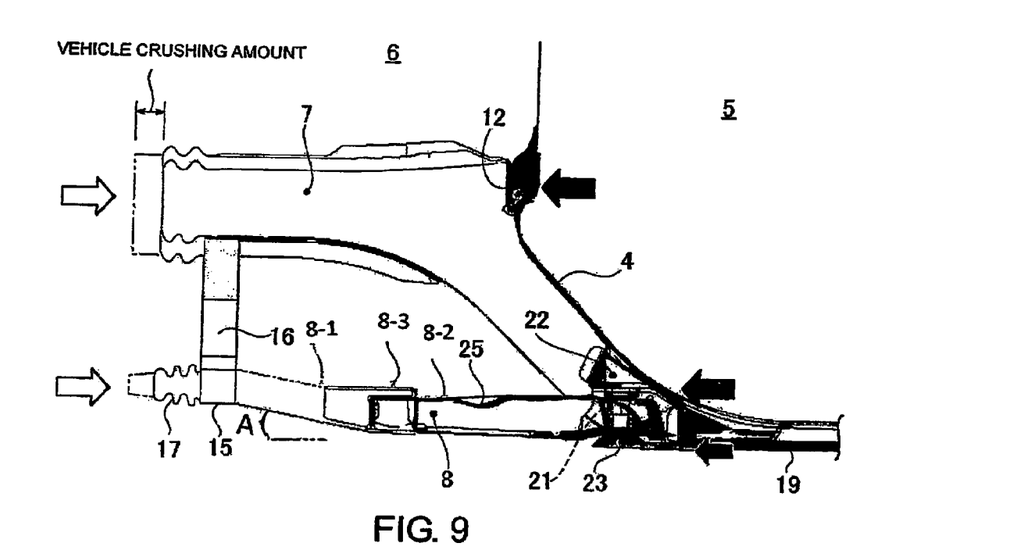
FIG. 9 is a schematic side elevational view of the front section vehicle body structure that illustrates an initial reaction force bearing action occurring in response to an initial input load imparted to the front section vehicle body structure of the illustrated embodiment during a front end collision.

As shown in FIGS. 3 and 9, each of the front suspension support members 8 has a support hole formed in rearward base portion. A pin member 21 is inserted into each of the support holes so as to be oriented in a vertical direction of the vehicle. In this way, the front suspension support members 8 are attached at their rearward ends to the vehicle body (e.g. the dash panel 4, the dash cross member 12 and the outrigger panels 19). The pin members 21 constitute a vehicle body support structure that supports the front suspension support members 8 to the vehicle body. As shown in FIGS. 3 and 7, each of the pin members 21 is arranged such that an upper end of each of the pin members 21 is supported by a bracket 22 (e.g., an upper support surface) and a bottom end of each of the pin members 21 is supported by a stay 23 (e.g., a bottom support surface). Each of the bracket 22 has a closed cross sectional shape. Each of the stay 23 has an open cross sectional shape that is open on a bottom side. As shown in FIGS. 3 and 7, each of the brackets 22 is fixed to the dash panel 4 at a position where the dash panel 4 is reinforced with a reinforcing panel 24. As shown in FIGS. 3 and 7, each of the stays 23 is fixed to the outrigger panel 19 and serves to restrict movement of the pin member 21, which serves to support the front suspension support members 8 on the vehicle body frame, which includes the front side frame member 7.

Each of the front suspension support members 8 has a rotation inducing structure that is configured to induce a bending rotation of the front suspension support members 8 in a downward direction when the front suspension support members 8 receives a load exceeding a predetermined value during a front end collision. The rotational inducing structure will now be explained.

Figure 8A:
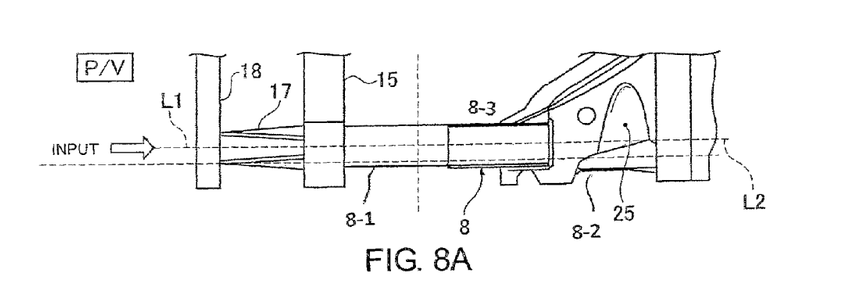
FIG. 8A is a partial top plan view of a front suspension support members of the front section vehicle body structure illustrated in FIGS. 1 to 7 in accordance with the first embodiment.
Figure 8B:
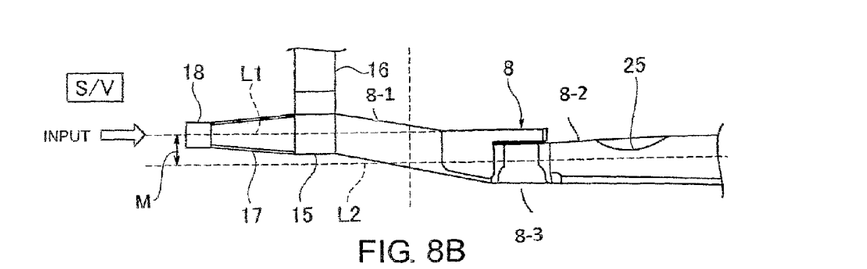
FIG. 8B is a partial side elevational view of a front suspension support members of the front section vehicle body structure illustrated in FIGS. 1 to 8A in accordance with the illustrated embodiment.

Referring to FIGS. 8A and 8B, each of the front suspension support members 8 has an input centerline L1 (input center axis) and a vehicle body support centerline L2 (support center axis). The centerlines L1 and L2 of each of the front suspension support members 8 are offset from each other in a vertical direction of the vehicle by an offset amount M. In particular, the input centerline L1 is positioned above the vehicle body support centerline L2 for each of the front suspension support members 8. However, in a top plan view as seen in FIG. 8A, the centerlines L1 and L2 are coincident with each other. The bending rotations of the front suspension support members 8 are induced by a moment corresponding to an input load imparted to the front suspension support members 8 and the offset amount M. As used herein, the phrase "input centerline" or "input center axis" refers to a horizontal resultant vector of an impact force that is applied to a front suspension support member in a longitudinal direction of the vehicle. On the other hand, as used herein, the phrase "vehicle body support centerline" or "support center axis" refers to a horizontal line that extends in a longitudinal direction of the vehicle and that passes through a center of the suspension support member at the rearward attachment point (e.g., the pin member 21) to the vehicle body.

Referring to FIGS. 8A and 8B, each of the front suspension support members 8 includes a front portion 8-1 and a rear portion 8-2 that are coupled together at a coupling location 8-3. The front end of the front portion 8-1 is coupled to the suspension cross member 15 and a rear end of the front portion 8-1 is coupled to a front end of the rear portion 8-2 at the coupling location 8-3. The rear portion 8-2 has a weak section 25 that is formed by a crushing bead. The weak section 25 (e.g., the crushing bead) is provided on an upper face of each of the front suspension support members 8 in a prescribed position where bending is desired to occur. In other words, the weak section 25 of each of the suspension support members is located in a prescribed position that induces bending at the prescribed position. The weak section 25 constitutes a bending inducement structure for each of the front suspension support members 8.

Referring to FIG. 3, each of the rotation inducing structures defines an upper surface rotational axis B. In particular, the support strength of the brackets 22 with respect to a load applied to the pin members 21 is set to be high, while the support strength of the stays 23 is set to be low as compared to the support strength of each of the brackets 22. As a result, the upper surface rotational axis B is set to be located at a connecting point between the pin member 21 and the bracket 22. In this way, a downward bending rotation (direction of arrow C) of the front suspension support members 8 is induced during a front end collision.

The operational effects of the vehicle body structure will now be explained according to the first embodiment with respect to the following topics: reason for inducing bending of the suspension support members during a collision, input energy absorbing action during a front end collision, and comparison of vehicle body deceleration rate characteristics.

First, a reason for inducing bending of the suspension support members 8 in the vehicle body structure during a front end collision will be discussed. By configuring one of the side frame members 7 and the suspension support members 8 to undergo an axial collapse and the other of the side frame members 7 and the suspension support members 8 to undergo bending during a collision, the member that undergoes an axial collapse can continue controlling a reaction force even after the other member that undergoes bending has finished bending. Thus, theoretically, it does not matter which of the side frame member and the suspension support members is assigned the function of being an axially collapsing member and which is assigned the function of being a bending member. However, in order to reduce an impact load imparted to a passenger during a collision, it is efficient to configure the vehicle such that, during a collision, an initial input to the bending member is larger than an initial input to the axial collapsing member. Therefore, by configuring the suspension support members to be the bending member, a more lightweight structure can be achieved than if the side frame member is set as the bending member because the suspension support members can be supported in an axial direction by the side frame extension due to its relationship with respect to the cabin. Meanwhile, if the side frame member is set as the bending member, then a large-scale reinforcement of the dash panel will be required in order to suppress deformation of the cabin because the side frame member is supported by the dash cross member in a bending direction. Consequently, the mass of the vehicle will increase.

In other words, the side frame member is supported by a structure that supports the dash panel in a bending direction (beam flexing direction). Consequently, it is necessary to reinforce the entire dash panel in order to reduce an amount of cabin deformation that occurs when a large input is imparted to the side frame member and, thus, a large increase in mass is unavoidable. Conversely, since an input from the suspension support members can be supported by the vehicle body frame (including the side frame member) in an axial direction, a large input load imparted to the suspension support members can be supported with a comparatively lightweight reinforcement. As explained above, when there are two load paths through which a load can pass during a collision, i.e., the side frame members and the suspension support members, two reasons can be given for selecting the suspension support members to be the member that undergoes bending. First, portions surrounding a portion where the suspension support members is fixed to the vehicle body are sufficiently strong that an initial reaction force can be increased without requiring a large reinforcement to the cabin. Second, in order to reduce a relative movement amount of a passenger, i.e., in order to achieve a passenger restraining force at an earlier stage, it is advantageous to use the member having a larger initial reaction force as the bending member.

Now, input energy absorbing action by the vehicle body structure during a front end collision will be discussed. The reasons given above, in the front section vehicle body structure according to the first embodiment, the front side frame members 7 are configured to be the axial collapsing members and the front suspension support members 8 are configured to be the bending members. An input energy absorbing action of the front section vehicle body structure according to the first embodiment will now be explained in terms of the following stages: an initial input stage, a bending induction stage, an end of vehicle crushing stage and a rotation induction stage.

As shown in FIG. 9, during an initial input stage of a front end collision when an impact force increases suddenly, an initial reaction force is born by the members 7 and 8, which extend in a longitudinal direction of the vehicle, and the members 7 and 8 absorb imparted energy by undergoing axial collapse. At this time, the front side frame members 7 undergo chiefly axial collapse at a portion located farther frontward than the connecting member 16, and the front suspension support members 8 undergoes axial collapse chiefly at the crush box 17. As can be seen in FIG. 9, the front portion 8-1 of each of the front suspension support members 8 pivots upward at an angle A with respect to the rear portion 8-2 of the front suspension support members 8. Thus, while a load input imparted to the front suspension support members 8 is below a predetermined value due to the absorption of imparted energy, the front suspension support members 8 does not bend and a large vehicle body deceleration rate can be achieved with a small vehicle crushing amount.

Figure 10:
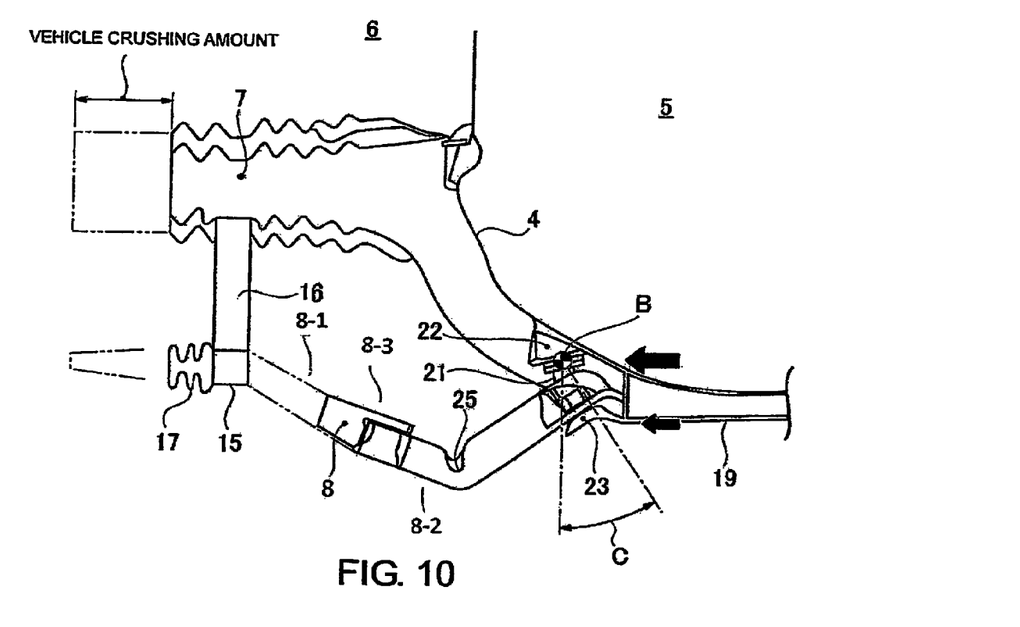
FIG. 10 is a schematic side elevational view of the front section vehicle body structure that illustrates a bending action of a front suspension support member occurring in response to the input load of FIG. 9 being further imparted to the front section vehicle body structure of the illustrated embodiment during a front end collision.

Then, when a load input transmitted to the front suspension support members 8 becomes equal to or larger than the predetermined value, the rotation inducing structure provided in the front suspension support members 8 induce a bending rotation of the front suspension support members 8, as shown in FIG. 10. In particular, the rear portion 8-2 of each of the front suspension support members 8 experiences the bending rotation. As a result, the front suspension support members 8 reliably begin to undergo bending and an excessive out-of-plane force is prevented from being imparted to the front side frame members 7. Additionally, since the bending rotation is induced even after bending of the front suspension support members 8 have started, the front side frame members 7 continues to undergo axial collapse throughout the collision event even after the front suspension support members 8 have undergone bending. Thus, a deformation mode can be achieved in which the input energy is absorbed efficiently with a small vehicle crushing amount corresponding to the axial collapse of the front side frame member 7 such that a decline of the vehicle body deceleration rate that results when the front suspension support members 8 begin to bend can be held to a small amount of decline.

Figure 12:
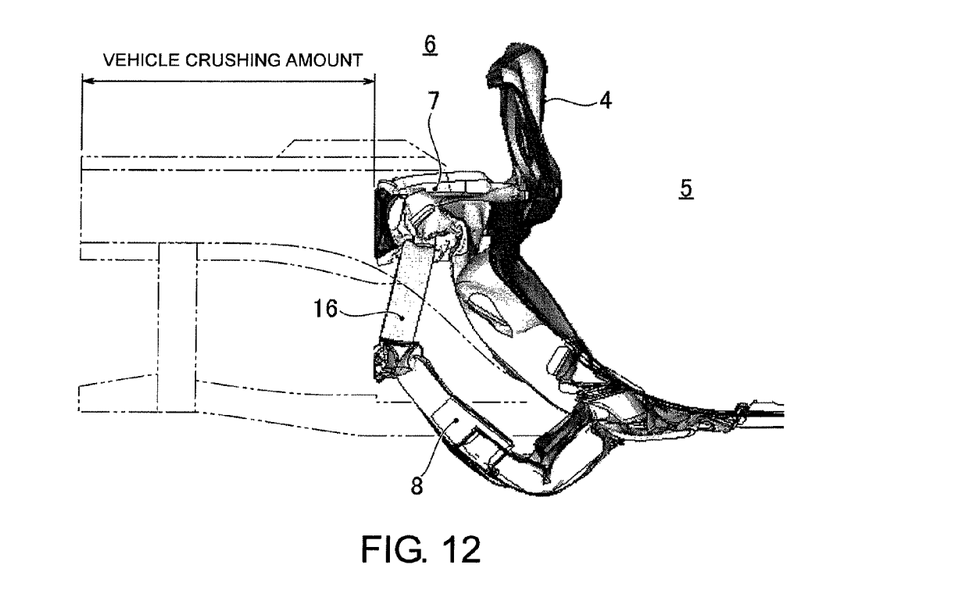
FIG. 12 is a schematic side elevational view of the front section vehicle body structure that illustrates a vehicle crushing action resulting from an input load to the front section vehicle body structure of the illustrated embodiment during a front end collision.
Figure 13:
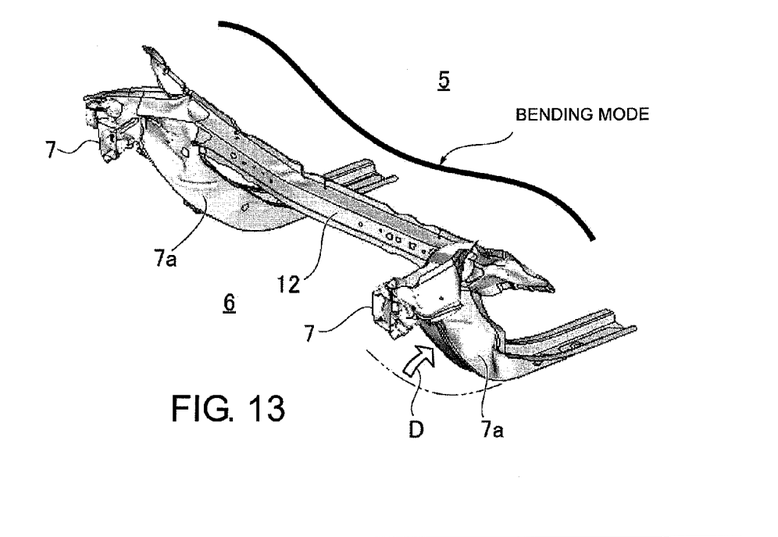
FIG. 13 is a schematic side elevational view of the front section vehicle body structure that illustrates a deformation action of a dash cross member resulting from an input load to the front section vehicle body structure according to the illustrated embodiment during a front end collision.

After the front suspension support members 8 bend with an increase in vehicle crushing amount and a deformation mode is established in which the front side frame members 7 undergo axial collapse and absorb input energy efficiently with a small vehicle crushing amount, the vehicle deceleration rate increases again. When the input energy has been substantially absorbed, the vehicle deceleration rate decreases again. As shown in FIG. 12, the crushing of the vehicle ends when the input energy has been completely absorbed. The dash cross member 12 suppresses deformation of the cabin 5 by supporting the front side frame members 7 in a bending direction with the bending mode shown in FIG. 13. The side frame extensions 7a also suppress deformation of the cabin 5 by supporting the front side frame members 7 in a bending direction as indicated with an arrow D shown in FIG. 13.

During the bending rotation induction stage, the rotation inducing structures induces bending rotation of the front suspension support members 8. This bending rotation inducing action with respect to the front suspension support members 8 will now be explained. Due to the offset amount M in the rotation inducing structures, the direction of a bending moment exerted against the vehicle body support structure by the front suspension support members 8 is prescribed and the front suspension support members 8 can be made to bend in a stable fashion. The weak sections 25 of the rotation inducing structures enables a bending position to be controlled. Thus, by using both the offset amount M and the weak section 25, the deformation mode exhibited by the front suspension support members 8 in a front end collision can be controlled in a reliable manner and the vehicle body deceleration rate can be decreased as intended.

Figure 11:
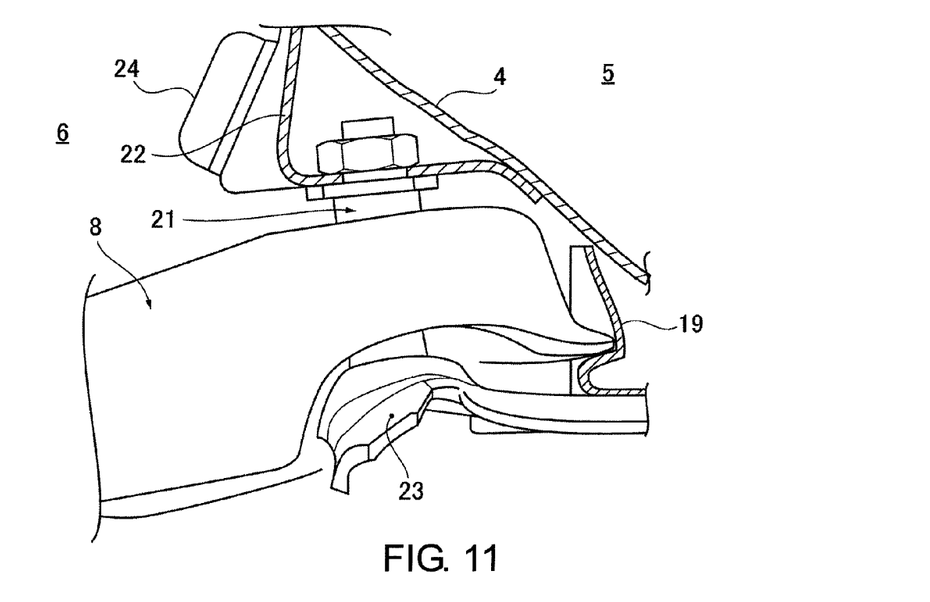
FIG. 11 is a schematic side elevational view of the front section vehicle body structure that illustrates a deformation action of vehicle body support section occurring when the suspension support member bends.

Bending of the front suspension support members 8 is also induced by rotating the front suspension support members 8 about the upper surface rotational axis B of the rotation inducing structures. A support strength of the brackets 22 with respect to a load applied to the pin members 21 is set to be high, and a support strength of the stays 23 is set to be low as compared to the support strength of the brackets 22. As a result, as shown in FIG. 11, the stays 23 on the bottom surface side deform and collapse first and a rearward end portion of the front suspension support members 8 hits the outrigger panels 19. Then, as shown in FIG. 10, a downward bending rotation of the front suspension support members 8 is induced such that the front suspension support members 8 rotates about the upper surface rotational axis B, which is located at a portion where the pin member 21 and the bracket 22 connect. This bending rotation is useful for at least the following three reasons. First, the deformation mode exhibited by the front suspension support members 8 during a front end collision can be controlled in a reliable manner and the vehicle body deceleration rate can be decreased as intended. Second, since the front suspension support members 8 do not easily penetrate into the cabin 5, the amount of deformation the cabin 5 undergoes during the collision can be reduced. Third, the deformation amount of the cabin 5 can be reduced because parts mounted on the front suspension support members 8 are drawn under the vehicle as the front suspension support members 8 bends.

Now the vehicle body deceleration rate characteristics of the vehicle body structure according to the first embodiment will be compared to a comparative example in which the front suspension support members do not have a rotation inducing structure according to the first embodiment. Similarly to the first embodiment, the comparative example is configured such that, in a front end collision, the front side frame members serve as axial collapsing members and the front suspension support members serve as bending members. In the comparative example, the start and continuation of bending of the front suspension support members are not reliably carried out because the axial collapse of the front side frame members does not proceed smoothly if an out-of-plane force acts on the front side frame members. Additionally, after the front suspension support members have finished bending, the front side frame members do not necessarily continue undergoing axial collapse. Thus, during a front end collision, a vehicle body reaction force cannot be maintained beyond a prescribed value and a vehicle body deceleration rate (i.e., reaction force) cannot be controlled. Consequently, the vehicle body deceleration rate undergoes a rapid decline, as indicated at the point A' in FIG. 14. As a result, as indicated by the characteristic depicted with a single-dot chain line in FIG. 14, the vehicle crushing amount increases greatly and the increase of the vehicle crushing amount makes it necessary to use a longer front overhang.

Conversely, with the front section vehicle body structure according to the first embodiment, in a front end collision the front side frame members 7 serve as axially collapsing members, the front suspension support members 8 serve as bending members, and the front suspension support members 8 have rotation inducing structures. Consequently, the structure according to the embodiment can achieve the vehicle deceleration rate characteristic shown in FIG. 14.

Figure 14:
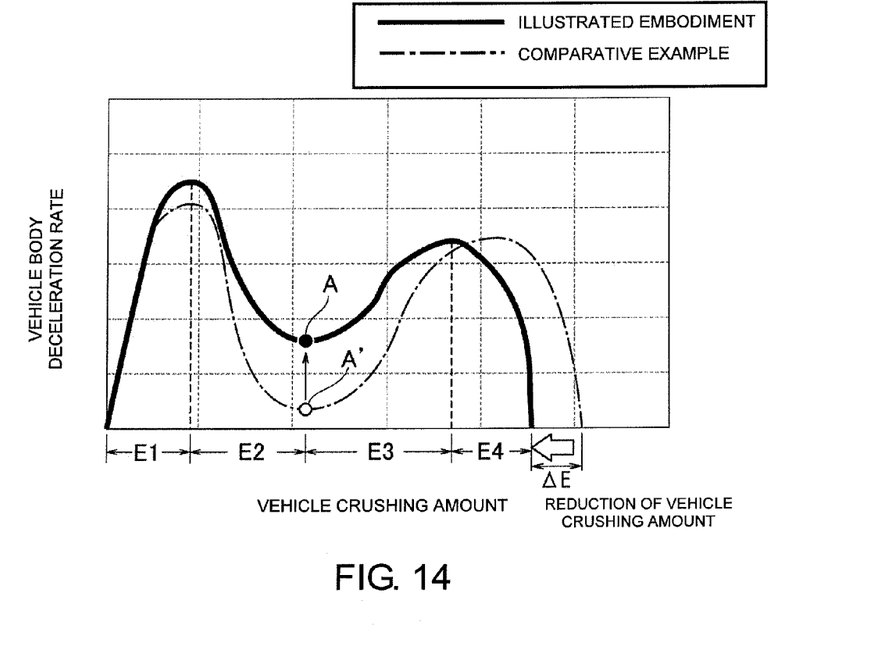
FIG. 14 is a characteristic comparison diagram comparing vehicle crushing amount versus vehicle body deceleration rate characteristics of a structure of the illustrated embodiment and a structure according to a comparative example.

The vehicle deceleration rate characteristic obtained with the structure according to the embodiment will now be explained in terms of four successive intervals. The first interval E1 lasts until the vehicle body deceleration rate reaches a peak and serves as an interval in which a passenger restraining force is accelerated to occur at an earlier stage. The next interval E2 lasts until the vehicle body deceleration rate reaches a minimum value and serves as an interval in which the structure suppresses a relative movement amount of a passenger caused by a speed difference between the vehicle and the passenger. In other words, during this interval, the deceleration rate decreases because the front suspension support members 8 bends. The next interval E3 lasts until the vehicle body deceleration rate reaches another peak and serves as an interval during which the structure suppresses the relative movement amount of the passenger after having reduced a relative speed between the vehicle and the passenger. The last interval E4 spans from when the vehicle body deceleration rate is at the peak until it reaches zero and serves as an interval during which the vehicle crushing caused by the front end collision ends.

The objectives of this vehicle body deceleration rate control are to restrain the passenger at an earlier stage and to reduce the amount of relative movement between the passenger and the vehicle. With the front vehicle body structure according to the first embodiment, during a front end collision a vehicle body reaction force equal to or larger than a prescribed value can be maintained because the front side frame members 7 continue to undergo axial collapse. Consequently, as indicated with the point A in FIG. 14, a minimum vehicle body deceleration rate reached while the vehicle is being crushed can be controlled to be higher than with the comparative example. As a result, during a collision, the vehicle is crushed at a larger vehicle deceleration rate due to the control of the vehicle body deceleration rate (i.e., reaction force) and the vehicle crushing amount can be reduced in comparison with the comparative example (by a vehicle crushing amount reduction quantity $\Delta E$).

With the first embodiment, an electric vehicle IWM-EV equipped with in-wheel motors 3 can be designed to have an extremely short front overhang because it is not necessary to arrange a power train inside the engine room or motor room. A front end vehicle body structure according to the embodiment 1 is well suited for use in such an electric vehicle IWM-EV because it can reduce the vehicle crushing amount.

The effects of the front section vehicle body structure of the first embodiment will now be explained.

In accordance with a first aspect, the vehicle body structure comprises a pair side frame members and a pair of suspension support members with a rotation inducing structure. The side frame members (e.g., the front side frame members 7) are arranged on left and right positions of the vehicle body and form portions of the vehicle body frame that extend in a longitudinal direction of the vehicle for absorbing energy imparted during a collision by undergoing an axial collapse. The suspension support members (e.g., the front suspension support members 8) are arranged parallel to the side frame members (e.g., the front side frame members 7). The suspension support members (e.g., the front suspension support members 8) serve to support suspension link members (e.g., the lower link 9 and the upper link 10), and configured to bend during a collision. The rotation inducing structures (e.g., the offset amount M, the pin members 21, the weak sections 25, and the upper surface rotational axis B) are provided in the suspension support members (e.g., the front suspension support members 8) and serve to induce bending rotation of the suspension support members (e.g., the front suspension support members 8) during a collision if an imparted load input is equal to or larger than a predetermined value. As a result, the vehicle body deceleration rate (reaction force) can be controlled as intended during a collision such that the vehicle body deceleration rate is increased and the vehicle crushing amount is held to a small amount.

In accordance with a second aspect, in the aforementioned rotation inducing structures, an input centerline L1 of a suspension support member (e.g., the front suspension support member 8) and a vehicle body support centerline L2 of the same suspension support member (e.g., the front suspension support member 8) are offset from each other in a vertical direction of the vehicle such that a bending rotation of the suspension support members (e.g., the front suspension support members 8) is induced by a moment corresponding to the offset amount M and an input load imparted to the suspension support members (e.g., the front suspension support members 8). In addition to the effects described above, this structure sets the direction of the bending moment exerted against the vehicle body support structure of the suspension support members (e.g., the front suspension support members 8) and enables the suspension support members (e.g., the front suspension support members 8) to bend in a stable manner.

In accordance with a third aspect, the weak section 25 is provided on each of the suspension support members (e.g., the front suspension support members 8) in a prescribed position where bending is desired to occur. As a result, in addition to the effects explained above, a bending position of the suspension support members (e.g., the front suspension support members 8) can be controlled to a prescribed position where bending is desired.

In accordance with a fourth aspect, in the aforementioned rotation inducing structures, each of the suspension support members (e.g., the front suspension support members 8) is supported on a pin member 21 arranged along a vertical direction of the vehicle and the pin member 21 is held between an upper support surface (e.g., the bracket 22) fixed to the vehicle body and a bottom support surface (e.g., the stay 23) fixed to the vehicle body. The rotation inducing structures induce bending rotation of the suspension support members (e.g., the front suspension support members 8) in a downward direction of the vehicle by establishing a rotational axis (e.g., the upper surface rotational axis B) at a portion of the pin member 21 where the pin member 21 connects to the upper support surface (e.g., the bracket 22). Thus, in addition to the effects explained above, the suspension support members (e.g., the front suspension support members 8) are induced to bend downward about the upper surface rotational axis B. As a result, the deformation mode of the suspension support members (e.g., the front suspension support members 8) can be controlled reliably and the amount of deformation incurred by the cabin 5 can be reduced.

In accordance with a fifth aspect, the upper support surface includes a bracket member 22 having a closed cross sectional shape and the bottom support surface includes a stay 23 having a cross sectional shape that is open on a bottom side. Thus, in addition to the effects explained above, a support strength difference can be established between the bracket 22 and the stay 23. As a result, the rotational axis (e.g., the upper surface rotational axis B) about which the suspension support members (e.g., the front suspension support members 8) will undergo bending rotation in a downward direction can be preset in a reliable fashion.

Although a vehicle body structure is explained heretofore based on a first embodiment, the specific constituent features are not limited to those of the first embodiment. Various design changes and additions can be made without departing from the scope of the invention defined by the claims.

In the first embodiment, the offset amount M, the weak section 25, and the upper surface rotational axis B are provided as examples of three the rotation inducing structures used to induce bending rotation of the front suspension support members. However, it is acceptable to use only two of the three structures or only one of the three structures. It is also acceptable to use a structure other than the three structures explained above so long as the other structure is useful for inducing bending rotation. In short, the vehicle body structure is not limited to the structures presented in the first embodiment so long as the rotation inducing structure induces bending rotation of the suspension support members when an load input exceeding a predetermined value occurs during a collision.

The first embodiment presents an example of the vehicle body structure being applied to a front section vehicle body structure configured to absorb an input energy during a front end collision. However, the vehicle body structure can also be applied to a rear section vehicle body structure configured to absorb an input energy during a rear end collision. When so applied, the vehicle body structure enables a rear overhang to be shortened.

Although the first embodiment presents an example in which the vehicle body structure is applied to an electric vehicle equipped with in-wheel motors, the vehicle body structure can also be applied to a fuel cell vehicle, a hybrid vehicle, an electric vehicle equipped with an electric motor in a motor room, or another type of electric powered vehicle. A vehicle body structure can also be used in a vehicle having a gasoline engine, a diesel engine, or other engine as a drive source.

In understanding the scope of the vehicle body structure, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure. The terms of degree such as "substantially", "about" and "approximately" as used herein mean a reasonable amount of deviation of the modified term such that the end result is not significantly changed.

Thus, the foregoing descriptions of the embodiments according to the present invention are provided for illustration only, and not for the purpose of limiting the invention as defined by the appended claims and their equivalents.

What is claimed is:

1. A vehicle body structure comprising:
    a pair of side frame members extending in a longitudinal direction of the vehicle body structure and configured to absorb energy imparted during a collision in the longitudinal direction of the vehicle body structure by undergoing an axial collapse; and
    a pair of suspension support members arranged parallel to the side frame members, serve to support a suspension link member, and configured to bend during the collision; and
    each of the suspension support members including a front portion and a rear portion that are coupled together, with a front end of the front portion being coupled to a suspension cross member and a rear end of the front portion being coupled to a front end of the rear portion, and the rear portion including a rotation inducing structure that is configured to induce a bending rotation of the suspension support members during the collision upon an imparted load input from the collision being equal to or larger than a predetermined value such that the front portion pivots upward at an angle with respect to the rear portion and the rear portion experiences the bending rotation.

2. The vehicle body structure as recited in claim 1, wherein
    each of the suspension support members includes a support centerline and an input centerline that is offset from the support centerline of a corresponding one of the suspension support members by an offset amount, and
    the rotation inducing structures are configured with respect to the suspension support members such that a bending rotation is induced in each of the suspension support members by a moment corresponding to the offset amount and an input load imparted to the suspension support members.

3. The vehicle body structure as recited in claim 1, wherein each of the suspension support members includes a weak section at a prescribed position that induces bending at the prescribed position.

4. The vehicle body structure as recited in claim 2, wherein each of the rotation inducing structures includes a pin member extending in a vertical direction of the vehicle and held between an upper support surface fixed to the vehicle body and a bottom support surface fixed to the vehicle body, each of the pin members establishing a rotational axis where the pin member connects to the upper support surface to induce the bending rotation of the suspension support members in a downward direction of the vehicle.

5. The vehicle body structure as recited in claim 4, wherein the upper support surface includes a bracket member having a closed cross sectional shape, and
the bottom support surface includes a stay having a cross sectional shape that is open on a bottom side.

6. The vehicle body structure as recited in claim 2, wherein each of the suspension support members includes a weak section at a prescribed position that induces bending at the prescribed position.

7. The vehicle body structure as recited in claim 6, wherein each of the rotation inducing structures includes a pin member extending in a vertical direction of the vehicle and held between an upper support surface fixed to the vehicle body and a bottom support surface fixed to the vehicle body, each of the pin members establishing a rotational axis where the pin member connects to the upper support surface to induce the bending rotation of the suspension support members in a downward direction of the vehicle.

8. The vehicle body structure as recited in claim 7, wherein the upper support surface includes a bracket member having a closed cross sectional shape, and
the bottom support surface includes a stay having a cross sectional shape that is open on a bottom side.

9. The vehicle body structure as recited in claim 3, wherein each of the rotation inducing structures includes a pin member extending in a vertical direction of the vehicle and held between an upper support surface fixed to the vehicle body and a bottom support surface fixed to the vehicle body, each of the pin members establishing a rotational axis where the pin member connects to the upper support surface to induce the bending rotation of the suspension support members in a downward direction of the vehicle.

10. The vehicle body structure as recited in claim 9, wherein
the upper support surface includes a bracket member having a closed cross sectional shape, and
the bottom support surface includes a stay having a cross sectional shape that is open on a bottom side.

* * * * *